United States Patent [19]

Morsbach et al.

[11] 4,183,544
[45] Jan. 15, 1980

[54] MULTI-PART PISTON OIL RING

[75] Inventors: Martin Morsbach; Paul Jöhren, both of Burscheid, Fed. Rep. of Germany

[73] Assignee: Goetzewerke, Friedrich Goetze AG, Burscheid, Fed. Rep. of Germany

[21] Appl. No.: 902,921

[22] Filed: May 4, 1978

[30] Foreign Application Priority Data

May 6, 1977 [DE] Fed. Rep. of Germany ....... 2720297

[51] Int. Cl.² ............................................. F16J 9/00
[52] U.S. Cl. .................................................. 277/141
[58] Field of Search ...................... 277/139, 140, 141

[56] References Cited

U.S. PATENT DOCUMENTS

| | | | |
|---|---|---|---|
| 3,477,732 | 4/1965 | Warrick | 277/141 |
| 3,656,767 | 4/1972 | Matsumoto | 277/140 |
| 3,998,572 | 12/1976 | Warrick | 277/141 |
| 4,090,720 | 5/1978 | Morsbach et al. | 277/140 |

Primary Examiner—Robert I. Smith
Attorney, Agent, or Firm—Spencer & Kaye

[57] ABSTRACT

A spacer-expander member for holding one or two cylinder-engaging rails in a groove in a piston is formed to present a plurality of radially inwardly-directed spacer feet which are so located that they engage the groove bottom in a region spaced from the groove sides.

8 Claims, 3 Drawing Figures

MULTI-PART PISTON OIL RING

BACKGROUND OF THE INVENTION

The present invention relates to a multi-part oil ring for a piston, of the type composed of a steel band spacer and expander member which has a profiled cross section and which is transversely slotted alternately from opposite sides to cause the member to present a plurality of segments, and at least one rail which is supported by the member.

In order to reduce power losses within a piston and a piston ring group, as well as to improve their wear behavior, the automobile industry requires, inter alia, oil rings of the above-described type which are radially compressed so as to press radially outwardly on the cylinder wall with as low tangential forces as possible, on the one hand, and as uniform an oil stripping effect as possible, on the other hand.

Reduced tangential forces in the oil ring can be attained without difficulty, for example, by appropriately designing the spring characteristics of the segmented U-shaped sheet metal spacer and expander member. However, if the tangential force is reduced too much, this results in less contact pressure by the rails on the cylinder walls to such an extent that contours in the cylinder bearing surface which deviate from the ideal circular shape are compensated only to a lesser degree and oil passes the rail. This results in increased oil consumption and power loss. Compensation of this so-called form fitting capability connected with a reduced tangential force can be achieved mainly by reducing the radial rail thicknesses.

Three-part oil rings, including a U-shaped bent and segmented steel band spring spacer and expander member and two rails which rest on the arms of the U at the bottom and the top, respectively, are disclosed, for example, in U.S. Pat. Nos. 2,695,825 and 2,893,801. The ends of the U-shaped arms of the steel band spacer and expander member disclosed in U.S. Pat. No. 2,695,825 do not permit the use of rails having a small radial wall width because the resulting small radial structural depth creates the danger, particularly during installation, that the entire ring or the rails supported by the member, will slip out of the piston groove, i.e. will experience a so-called popout.

According to the concept disclosed in U.S. Pat. No. 2,893,801, the U-shaped arms of the spacer and expander member are not bent axially outwardly at their ends, but rather the bend is made approximately in the middle of each arm and the remaining free ends of the arms lie supportingly against respective sides of the ring-receiving groove during installation, so that in principle it is possible to use rails having a small radial wall width.

However, this solution is still not satisfactory because in reality the interior corners of a given piston ring holding groove are not square, as usually shown in simplified illustrations.

Rather, the corners between the sides and the base of the groove are rounded in view of fabrication requirements. It is therefore impossible for the free ends of the U-shaped spacer-expander to contact the bottom of the groove, i.e. for the purpose of centering the ring in the piston, a radial path length which would be identical with the radius of the groove bottom cannot be used to advantage.

SUMMARY OF THE INVENTION

It is therefore an object of the present invention to provide a multi-part oil ring, of the type whose steel band spacer-expander has a profiled cross section and is alternatingly approximately axially slotted, so as to permit the use of rails having as small a radial wall width as possible with good installation reliability and centerability.

This and other objects are accomplished according to the present invention by forming the spacer-expander to have radially inwardly oriented spacer feet at the inner circumference thereof. These spacer feet are preferably constituted by radially inwardly directed extension of U-shaped arms defining individual spacer-expander segments which are provided at regular intervals about the circumference of a type of spacer-expander disclosed, for example, in the above-cited patents. The extensions may be located at either side of the spacer-expander member, or preferably they are placed on the two sides alternatingly about the circumference of the ring.

In manufacture, it is now preferred, when cutting the sheet metal material, to leave material for the extensions of the U-shaped arms of individual member segments at regular intervals on one side of the strip, or both sides of the strip, or on alternating sides, over the entire width of the sheet or strip of material. All other segments, however, extend only to the width of the desired metal band. In the subsequent bending process the free ends of the extensions are then merely planar and bent radially inwardly and may then lie in the plane of the spacer-expander sides or below that plane. The free ends of the arms of the other segments are then bent outwardly in the axial directions in a known manner in order to radially support the rails.

The spacer-expander according to the present invention has the following advantages.

Independently of the radial width of the rails, the extended spacer feet permit any desired setting of the radial installation depth of the oil ring. Independently of the presence of rounded groove corners, the resulting raised position of the spacer feet, away from the groove side walls, permits centering of the ring on the bottom, or base, of the piston ring groove. Thus use can be made of rails which provide the desired tangential forces with a small radial width, and thus with the best possible form fitting capability. A person skilled in the art can easily select the size of the extensions of the spacer segments to correspond to the required value of the radial width of the rails.

DESCRIPTION OF THE PREFERRED EMBODIMENTS

Figure 1:
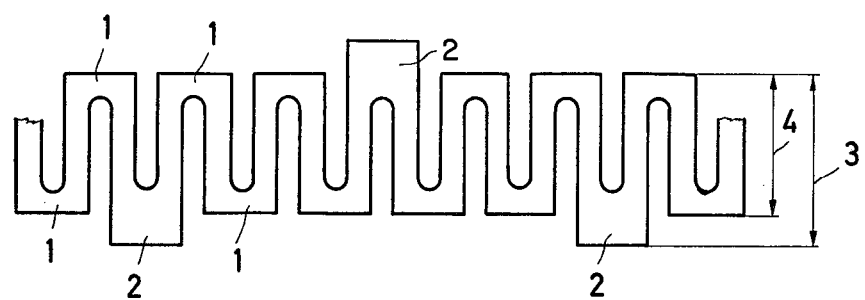
FIG. 1 is a detail plan view of the punching pattern for an embodiment of a spacer-expander according to the present invention.

FIG. 1 shows part of a strip of sheet metal punched out to permit it to be formed into a spacer-expander according to the invention and composed of transverse webs separated by slots extending from opposite sides of the strip, with successive webs being joined together by respective longitudinally extending segments 1. Each segment 1 and its two associated transverse webs define a generally U-shaped arm in the strip.

Only selected segments 2 are stamped out to extend to the limit of the entire original width 3 of the strip of material. The other segments are cut to conform only to the nominal width 4 of the band from which the spacer-expander will be formed. The segments 2, only one of which is shown in FIG. 1, later will serve as spacer feet.

Figure 2:
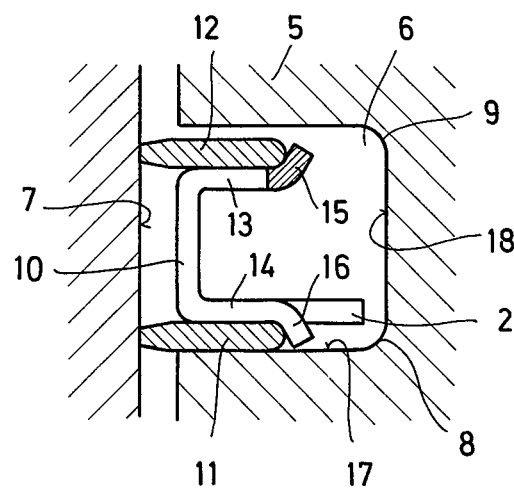
FIG. 2 is a cross-sectional view of a piston groove having an installed three-part oil ring according to the invention.

FIG. 2 shows part of a piston 5, a piston groove 6 and a wall 7 of the associated cylinder. The piston groove 6 has rounded corners 8 and 9 between its base 18 and sides 17. The inserted three-part piston ring includes a spacer-expander 10 which has been bent to have a U-shaped profile, and two rails 11 and 12 resting on the arms 13 and 14 of the U. The arms of this U are joined together by a base portion extending in the direction of the piston axis. The arms 13 and 14 of the U, which have been cut to the edges of the width 4 of the band, have their ends 15 and 16 bent outwardly in the axial direction of the piston to support the rails. The spring segments 2, which have been cut to extend to width 3 of the strip of material, are planar and extend radially inwardly. Segments 2 thus constitute spacer feet which are located in the region between groove side walls 17 away from corners 8 and 9 in order to be able to cooperate with the substantially cylindrical portion of groove base 18.

According to one preferred embodiment of the invention, one extended segment 2 is provided at each fifth segment along the length of the strip, i.e. around the circumference of the resulting spacer-expander 10, so that successive spacer feet would be located at alternate sides, or arms, of the member 10.

Figure 3:
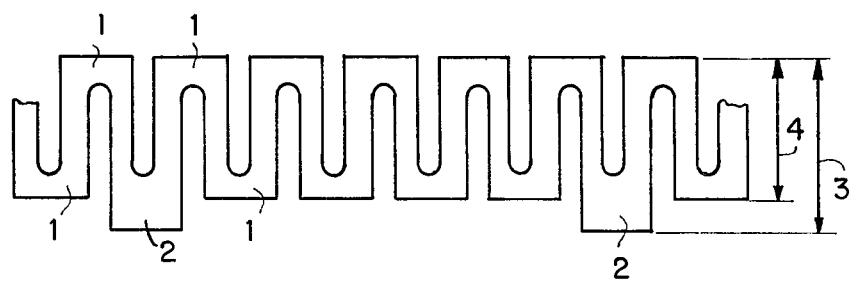
FIG. 3 is a view similar to that of FIG. 1 for a second embodiment of a spacer-expander according to the present invention.

This preferred embodiment is illustrated in FIG. 1, while FIG. 3 illustrates an embodiment in which extensions of the U-shaped arms are disposed at regular intervals on only one side of the strip.

It will be understood that the above description of the present invention is susceptible to various modifications, changes and adaptations, and the same are intended to be comprehended within the meaning and range of equivalents of the appended claims.

What is claimed is:

1. In a piston ring assembly including at least one cylinder-engaging rail and spacer-expander means composed of a sheet metal strip formed to have a profiled cross section and transversely slotted alternately from opposite sides to cause the strip to present a plurality of segments, the strip being curved into a circular form with the segments being spaced circumferentially therealong, the rail being supported by the spacer-expander means, the improvement wherein said spacer-expander means are further provided with a plurality of circumferentially spaced, inwardly radially directed spacer feet disposed at the inner circumference of said means.

2. An article as defined in claim 1 wherein the profiled cross section of said spacer-expander means has a U-shape composed of two arms extending radially inwardly, with each arm being composed of a row of said segments, and there are two of said rails each resting on a respective one of said arms.

3. An article as defined in claim 2 wherein each of said segments has the general form of a U in a plane perpendicular to the axis of the circle defining the curved form of said strip, and each said spacer foot is an extension of a respective one of said segments.

4. An article as defined in claim 3 wherein said feet are disposed at regular intervals around the circumference of said curved strip.

5. An article as defined in claim 3 wherein said feet are all located at one of said arms of said spacer-expander means and are disposed at regular intervals therearound.

6. An article as defined in claim 3 wherein said feet are located at both of said arms of said spacer-expander means, being disposed alternatingly on the two arms and at regular intervals around the circumference of said means.

7. An article as defined in claim 3 wherein said feet are located at every fifth segment along the circumference of said spacer-expander means.

8. An article as defined in claim 1 wherein each said spacer foot lies in a plane perpendicular to the axis of the circle defining the circumference of said assembly.

* * * * *